OR 3,533,344

T350/429

United States

[11] 3,533,344

| [72] | Inventor | Otto Thomas<br>Bad Kreuznach, Germany |
|---|---|---|
| [21] | Appl. No. | 673,551 |
| [22] | Filed | Oct. 9, 1967 |
| [45] | Patented | Oct. 13, 1970 |
| [73] | Assignee | Jos. Schneider and Co. Optische Werke<br>Kreuznach, Bad Kreuznach(Rhld.),<br>Germany<br>a corporation of Germany |
| [32] | Priority | Oct. 11, 1966 |
| [33] | | Germany |
| [31] | | No. 39,656<br>Pat. Sch39,665 |

[54] MECHANISM FOR DIFFERENTIALLY DISPLACING TWO OPTICAL COMPONENTS
3 Claims, 5 Drawing Figs.

[52] U.S. Cl................................................. 95/45,
350/44, 350/187
[51] Int. Cl.................................................. G03b 3/00
[50] Field of Search........................................ 95/45;
350/44, 187

_ited
UNITED STATES PATENTS

| 2,547,187 | 3/1951 | Walker........................ | 350/187 |
| 3,027,805 | 3/1962 | Yamaji........................ | 95/45X |
| 3,028,791 | 3/1962 | Clark et al. .................. | 350/44 |
| 3,095,750 | 7/1963 | Mahn .......................... | 95/45X |
| 3,166,629 | 1/1965 | Walter......................... | 350/44 |
| 3,242,800 | 3/1966 | Sanford....................... | 350/187 |

*Primary Examiner*—Norton Ansher
*Assistant Examiner*—Richard M. Sheer
*Attorney*—Karl F. Ross

ABSTRACT: Optical objective having two components displaceable along an optical axis with relative differential motion designed to provide a predetermined optical effect, such as a fixed image plane in a varifocal system, one of these components being freely movable by hand or by an automatic device and bearing upon a first camming edge of a swingable member having a second camming edge in engagement with the other component. The two components are urged by a spring into continuous contact with their respective camming edges which are shaped in accordance with a predetermined law determining the relative displacement of said components.

Otto Thomas
*Inventor.*

By Karl J. Ross
*Attorney*

3,533,344

MECHANISM FOR DIFFERENTIALLY DISPLACING TWO OPTICAL COMPONENTS

My present invention relates to an optical objective, e.g. as used in photographic, cinematographic or television cameras, in which two components are axially displaceable at different rates for purposes of focusing or, as is the more usual case, to vary the overall focal length of the objective while keeping its image plane fixed. Such varifocal objective systems are disclosed, for example, in commonly owned U.S. Pat. No. 3,165,044 to Paul Himmelsbach and U.S. Pat. No. 3,095,750 to Herbert Mahn.

In these prior systems, the differential displacement of the two concurrently movable components is brought about by separate camming formations, such as slots or grooves, in a rotatable control member. To avoid the need for such separate camming formations, which must be individually machined with great accuracy, there have already been proposed improvements whereby use is made of only one curve for the guidance of two differentially movable optical components. Reference is made in this connection to two commonly owned pending applications by Paul Himmelsbach, i.e. Ser. No. 620,973 filed March 6, 1967 now U.S. Pat. No. 3,359,885 and Ser. No. 640,862 filed May 24, 1967 now U.S. Pat No. 3,480,349. The first of these applications teaches the provision of a rotatable cam which turns about a fixed fulcrum in response to the axial displacement of a first component from a reference position, the cam being connected with this first component via a flexible link and controlling by its rotation the movement of the second component. According to the second Himmelsbach application, a cam follower swingably mounted on the first component has one end in contact with a fixed cam and another end in engagement with the controlled second component. In each case, the law of relative motion of the two components is determined solely by the shape of the cam.

The general object of my present invention is to provide a system of the general type described which is mechanically simpler than that of the first Himmelsbach application, avoiding the need for a flexible link, and affords greater mobility of the two components (including possible reversal of their relative motion) than does the system of the later Himmelsbach application.

This object is realized, in accordance with my present invention, by the provision of a swingable member with two camming edges, each of two axially moveable components having a respective cam follower in contact with one of these edges. As the first or master component is axially displaced, it causes the cam member to swing and to move the second component in a predetermined manner.

Suitable restraining means must, of course, be provided to keep the two cam followers in contact with their respective edges. This could be accomplished by positive interengagement, through the use of a slave cam as disclosed in the earlier Himmelsbach application, yet I prefer to utilize for this purpose a simpler arrangement in which a biasing spring is anchored to one or both components to maintain the parts in their cooperating relationship. With this arrangement I may also conveniently employ antifriction rollers as the two cam followers, thus reducing the frictional resistance to manual or automatic displacement of the master component.

The law of relative displacement of the components is uniquely determined by the shape of the two camming edges. Since only the motion of one component is to be controlled, one of the edges may be rectilinear or of some other simple shape; the other edge, usually the one engaged by the master component, must be machined in accordance with the desired law of motion.

The invention will be described in greater detail with reference to the accompanying drawings in which.

Figure 1:
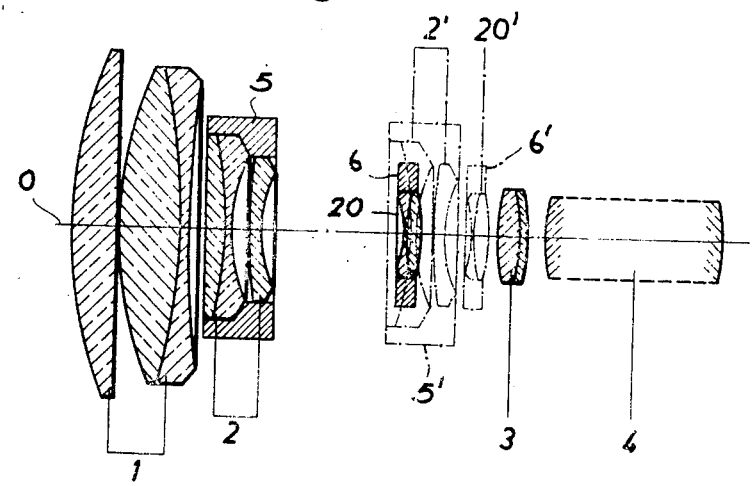
FIG. 1 is a somewhat diagrammatic sectional view of a varifocal optical objective with two axially movable components.
Figure 2:
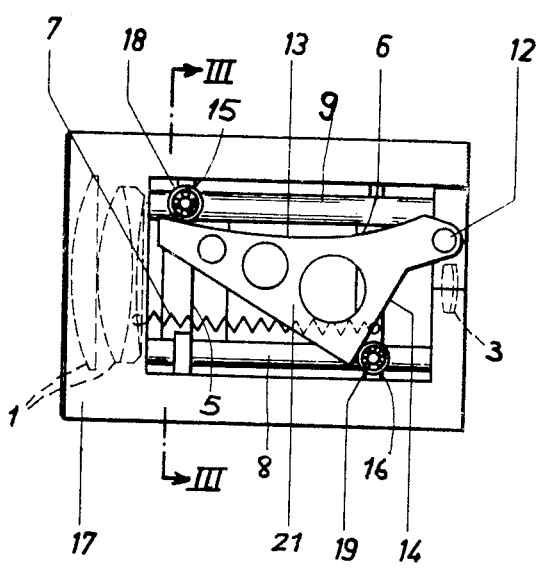
FIG. 2 is a side-elevational view of an objective housing containing part of the optical system of FIG. 1 along with a control mechanism according to the invention.
Figure 3:
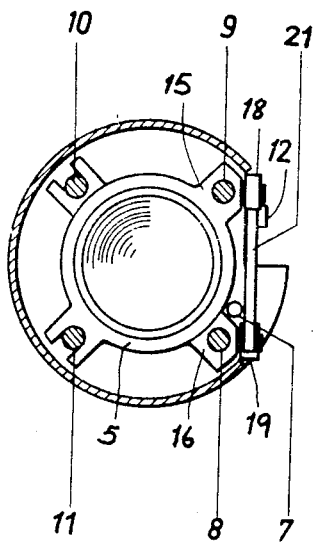
FIG. 3 is a cross-sectional view taken on the line III–III of FIG. 2.

In FIG. 1 I have shown a conventional varifocal objective with a fixed positive front component 1 (here consisting of two air-spaced lens members), a first axially movable component 2 of negative refractivity (also constituted by two members), a second axially movable component 20 whose refractivity may also be negative, and another fixed positive component 3, these components together representing a varifocal attachment for a fixed basic objective 4 of conventional construction. Movable components 2 and 20 are held in respective lens mounts 5 and 6 formed, as shown in FIGS. 2 and 3, with radial lugs 15 and 16 by which they are slidably supported on a set of fixed guide rods 8, 9, 10 and 11 extending parallel to the objective axis O. Components 2 and 20 can be displaced along this axis, as shown in FIG. 1, between a first limiting position illustrated in full lines and a second limiting position illustrated in dot–dash lines, the components and their mounts having been designated 2', 20' and 5', 6' in their latter position.

A generally cylindrical housing 17 encloses the components 1, 2, 20 and 3 and supports the guide rods 8—11. A cam member 21 is swingable about a pivot pin 12 rigid with the housing 17, this pin being located beyond the range of displacement of lens mount 5. Member 21 has two camming edges 13 and 14 converging in the general direction of fulcrum 12, i.e. a curved first edge 13 and a straight second edge 14. Edge 13, extending in generally axial direction, is in contact with a cam follower 18 which has the shape of a roller mounted via antifriction (e.g. ball type) journal bearings on one of the lugs 15 of lens mount 5. Edge 14 includes an acute angle, here of about 60°, with the objective axis O; this edge coacts with a cam follower 19, of the same construction as follower 18, carried by one of the lugs 16 of lens mount 6. A contractile spring 7 is anchored to the housing 17 and to lens mount 6 to bias the roller 19 into contact with edge 14 of cam member 21 whose edge 13 is thereby maintained in engagement with roller 18.

In operation, a rightward displacement of lens mount 5 (as viewed in FIG. 2) from its illustrated reference position causes the cam member 21 to swing, under the joint action of spring 7 and roller 18, first clockwise and later counterclockwise, with a resultant displacement of lens mount 6 first to the left and later to the right. Naturally, the sense and extent of the latter displacement may be altered through suitable modification of the shape of the curvilinear camming edge 13; the stroke of lens mount 6 can be varied by a change in the angle of inclination of edge 14.

The movement of the master component 2 in its lens mount 5 may be brought about manually or by automatic means, e.g. with the aid of a reversible electric motor as disclosed in the above-identified Himmelsbach patent. An alternate arrangement for controlling the position of component 2, and therefore also that of component 20, has been illustrated in FIGS. 4 and 5 and is similar to the system disclosed in the first-filed Himmelsbach application referred to.

The system shown in FIGS. 4 and 5, in which elements already described with reference to the preceding figures have been identified by the same reference numerals supplemented by the suffix a, comprises an arm 33 which is rigid with lens mount 5a and with a piston 27 slidable in a cylinder 26. This cylinder, disposed parallel to axis O and secured to the objective housing 17a, has two ports 34', 34" for the admission and removal of a hydraulic or pneumatic working fluid supplied by a source which is schematically represented by an arrow 31; a sink for the fluid is similarly indicated by an arrow 32. The fluid from source 31 passes through a regulation or throttle valve 35 which can be opened and closed by a control circuit 29; the fluid discharged at port 34" traverses a voltage generator 28 responsive to either the pressure or the velocity of the fluid. A selector 30, shown as a potentiometer, supplies to control circuit 29 an input voltage $v_i$ which is opposed by a feedback voltage $v_f$ from generator 28, the difference between these two voltages being an output voltage $v_o$ to determine the setting of valve 35. This throttle valve is preceded by a three-way valve 24 which in one position connects source 31 with the inlet 25 of valve 35 and in another position vents the inlet to the atmosphere. Voltage generator 28 may be designed as an oil motor responsive to the velocity of the passing fluid or as a bellows responsive to its pressure; potentiometer 30 may then be set to select a desired speed for axially moving the lens mount 5a or a desired position in which this lens mount will be arrested. It will be noted that the piston 27 and, therefore, the component 2a move from right to left in FIG. 4 when the valve 24 is in its illustrated operating position; upon a rotation of that valve to its alternate position, a restoring force here supplied by a spring 36 reverses the movement of these elements.

Figure 4:
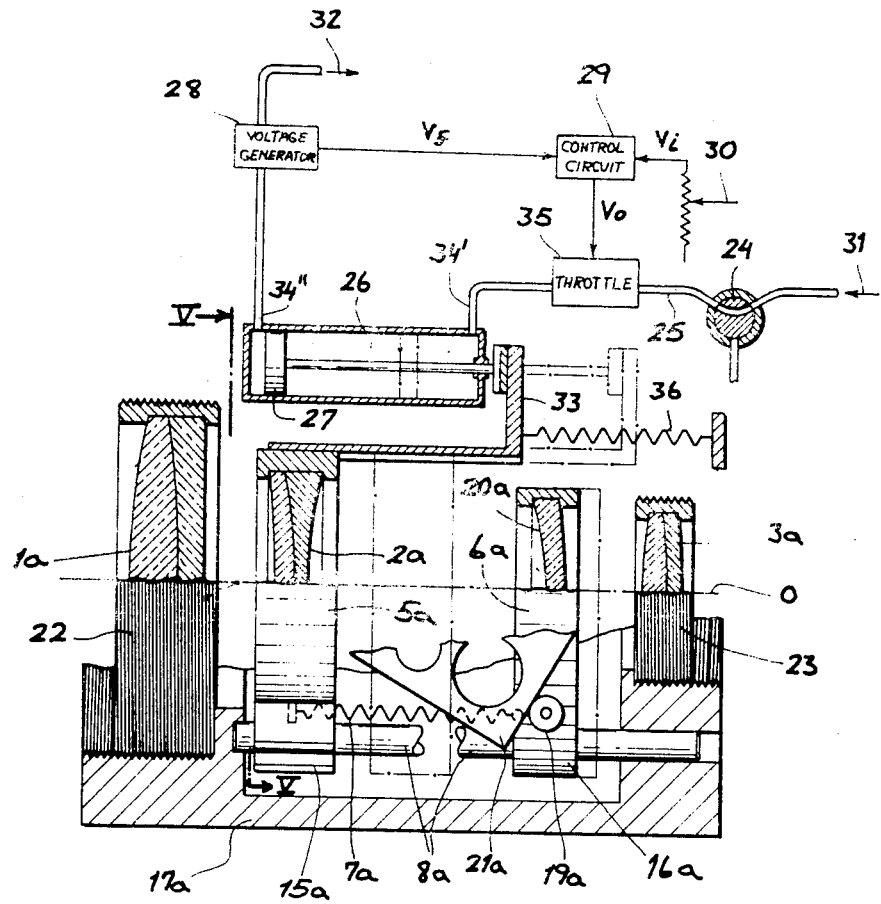
FIG. 4 is a somewhat diagrammatic side-elevational view, partly in section, of a modified assembly generally similar to that of FIG. 2.
Figure 5:
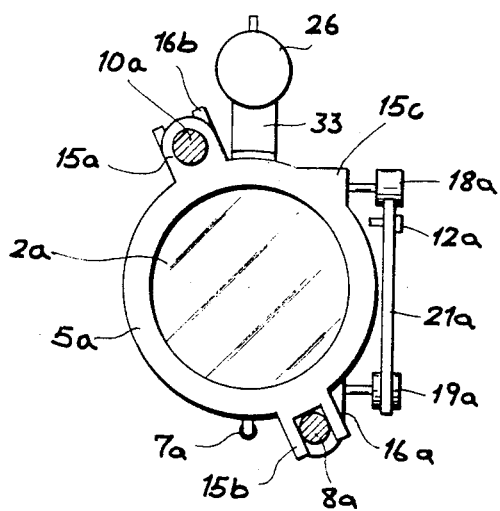
FIG. 5 is an axial view of the objective of FIG. 4, taken on the line V–V thereof.

FIG. 4 also shows additional lens mounts 22 and 23, threadedly held in housing 17a, for the fixed components 1a and 3a. The two movable components are guided in this embodiment by only two diametrically opposite rods 8a, 10a engaged by lugs 15a, 15b and 16a, 16b of lens mounts 5a and 6a, respectively. Lens mount 5a also has a boss 15c supporting the roller 18a which engages the upper edge of cam member 21a; the other roller 19a is supported by lug 16a of lens mount 6a. Member 21a, pivoted in the housing 17a at 12a, has been partly broken away in FIG. 4 to expose the underlying structure and may be similar to member 21 of FIG. 2.

In contradistinction to the preceding embodiment, spring 7a is anchored to the two lens mounts 5a and 6a; this, however, does not affect the mode of operation of the coupling between the two movable components.

I claim:

1. In an optical objective having a housing and a first and a second component in said housing displaceable along a common optical axis, the combination therewith of a generally triangular swingable member having a curved first camming edge extending in a generally axial direction and a substantially rectilinear second camming edge including an acute angle with said axial direction, rotatable first cam-follower means secured to said first component, and rotatable second cam-follower means secured to said second component, resilient restraining means anchored to at least one of said components for maintaining said first and second cam-follower means in rolling contact with said first and second camming edges, respectively, during axial displacement of said first component with consequent swinging of said member and axial displacement of said second component according to a predetermined law of relative motion, said member being swingable about a fixed fulcrum on said housing lying beyond the range of axial displacement of said first component, said camming edges converging in the general direction of said fulcrum.

2. The combination defined in claim 1 wherein said restraining means comprises a spring anchored to both said components.

3. The combination defined in claim 1 wherein said cam-follower means comprise rollers provided with antifriction journal bearings.